(12) United States Patent
Scholtes

(10) Patent No.: US 10,565,502 B2
(45) Date of Patent: *Feb. 18, 2020

(54) SYSTEM AND METHOD FOR AUTOMATIC DOCUMENT CLASSIFICATION IN EDISCOVERY, COMPLIANCE AND LEGACY INFORMATION CLEAN-UP

(71) Applicant: MSC INTELLECTUAL PROPERTIES B.V., Amsterdam (NL)

(72) Inventor: Johannes Cornelis Scholtes, Bussum (NL)

(73) Assignee: MSC INTELLECTUAL PROPERTIES B.V., Amsterdam (NL)

( * ) Notice: Subject to any disclaimer, the term of this patent is extended or adjusted under 35 U.S.C. 154(b) by 1025 days.

This patent is subject to a terminal disclaimer.

(21) Appl. No.: 14/989,969

(22) Filed: Jan. 7, 2016

(65) Prior Publication Data
US 2016/0117589 A1    Apr. 28, 2016

Related U.S. Application Data

(63) Continuation of application No. 13/693,075, filed on Dec. 4, 2012, now Pat. No. 9,235,812.

(51) Int. Cl.
*G06N 5/02* (2006.01)
*G06N 20/00* (2019.01)
(Continued)

(52) U.S. Cl.
CPC ............... *G06N 5/02* (2013.01); *G06F 16/00* (2019.01); *G06F 16/355* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2009/0144277 A1* | 6/2009 | Trutner | G06F 17/2241 |
| 2012/0278336 A1* | 11/2012 | Malik | G06F 17/2775 |
| | | | 707/748 |

OTHER PUBLICATIONS

Nigam, Kamal, et al. "Text classification from labeled and unlabeled documents using EM." Machine learning 39.2-3 (2000): 103-134. (Year: 2000).*

* cited by examiner

*Primary Examiner* — Daniel T Pellett
(74) *Attorney, Agent, or Firm* — Carlos R. Villamar; The Villamar Firm PLLC

(57) ABSTRACT

A system, method and computer program product for automatic document classification, including an extraction module configured to extract structural, syntactical and/or semantic information from a document and normalize the extracted information; a machine learning module configured to generate a model representation for automatic document classification based on feature vectors built from the normalized and extracted semantic information for supervised and/or unsupervised clustering or machine learning; and a classification module configured to select a non-classified document from a document collection, and via the extraction module extract normalized structural, syntactical and/or semantic information from the selected document, and generate via the machine learning module a model representation of the selected document based on feature vectors, and match the model representation of the selected document against the machine learning model representation to generate a document category, and/or classification for display to a user.

24 Claims, 16 Drawing Sheets

(51) Int. Cl.
*G06F 16/00* (2019.01)
*G06F 16/35* (2019.01)

EXAMPLE OF EXTRACTED INFORMATION

| | |
|---|---|
| CITY | New Brunswick, WASHINGTON |
| COMPANY | J&J Johnson & Johnson |
| COUNTRY | Greece, Poland, Romania, United Kingdom |
| CURRENCY | 02 USD 2140000 USD, 4860000 USD, 59.47 |

| | |
|---|---|
| PERSON transported OBJECT | "John transported the stolen goods across the border." |
| PERSON calls PERSON | "President Obama called French President Nicolas Sarkozy in July 2010." |
| PERSON received DOLLAR AMOUNT | "Articles by Tina Griego showed that the largest contribution was the $46,000 received by Manny Aragon." |
| QUALITY PROBLEMS | "We cannot ship that product, it does not work." |

Source: ZyLAB, 2012

FIG. 14

EXAMPLE OF BAG-OF-WORDS FEATURE VECTOR

Text document representation based on the BoW model (from Wikipedia)

Here are two simple text documents:

```
John likes to watch movies. Mary likes too.
John also likes to watch football games.
```

Based on these two text documents, a dictionary is constructed as:

```
{"John": 1, "likes": 2, "to": 3, "watch": 4, "movies": 5, "also": 6,
"football": 7, "games": 8, "Mary": 9, "too": 10}
``` which has 10 distinct words. And using the indexes of the dictionary, each document is represented by a 10-entry vector:

```
[1, 2, 1, 1, 0, 0, 0, 0, 1, 1]
[1, 1, 1, 0, 1, 1, 1, 0, 0]
``` where each entry of the vectors refers to count of the corresponding entry in the dictionary (this is also the histogram representation). This vector representation does not preserve the order of the words in the original sentences.

FIG. 16

SYSTEM AND METHOD FOR AUTOMATIC DOCUMENT CLASSIFICATION IN EDISCOVERY, COMPLIANCE AND LEGACY INFORMATION CLEAN-UP

CROSS REFERENCE TO RELATED APPLICATIONS

The present invention is a continuation of co-pending, U.S. patent application Ser. No. 13/693,075 of Scholtes, entitled "SYSTEM AND METHOD FOR AUTOMATIC DOCUMENT CLASSIFICATION IN EDISCOVERY, COMPLIANCE AND LEGACY INFORMATION CLEAN-UP," filed on Dec. 4, 2012, now allowed, the entire contents of all of the disclosures of which are hereby incorporated by reference.

BACKGROUND OF THE INVENTION

Field of the Invention

The present invention generally relates to systems and methods for document classification, and more particularly to systems and methods for automatic document classification for electronic discovery (eDiscovery), compliance, clean-up of legacy information, and the like.

Discussion of the Background

In recent years, various types of document classification systems and methods have been developed. However, with such document classification systems and methods, there is still a need to provide improved systems and methods that addresses limitations of what is referred to as a bag-of-word (BOW) approach.

SUMMARY OF THE INVENTION

Therefore, there is a need for a method and system that addresses the above and other problems with document classification systems and methods. The above and other problems are addressed by the illustrative embodiments of the present invention, which provide improved systems and methods that addresses limitations of what is referred to as a bag-of-word (BOW) approach. Advantageously, the illustrative systems and methods can provide automatic document classification for eDiscovery, compliance, legacy-information clean-up, and the like, while allowing for usage of various machine-learning approaches, and the like, in multi-lingual environments, and the like.

Accordingly, in illustrative aspects of the present invention there is provided a system, method, and computer program product for automatic document classification, including an extraction module configured to extract structural, syntactical and/or semantic information from a document and normalize the extracted information; a machine learning module configured to generate a model representation for automatic document classification based on feature vectors built from the normalized and extracted semantic information for supervised and/or unsupervised clustering or machine learning; and a classification module configured to select a non-classified document from a document collection, and via the extraction module extract normalized structural, syntactical and/or semantic information from the selected document, and generate via the machine learning module a model representation of the selected document based on feature vectors, and match the model representation of the selected document against the machine learning model representation to generate a document category, and/or classification for display to a user.

The extracted information includes named entities, properties of entities, noun-phrases, facts, events, and/or concepts.

The extraction module employs text-mining, language identification, gazetteers, regular expressions, noun-phrase identification with part-of-speech taggers, and/or statistical models and rules, and is configured to identify patterns, and the patterns include libraries, and/or algorithms shared among cases, and which can be tuned for a specific case, to generate case-specific semantic information.

The extracted information is normalized by using normalization rules, groupers, thesauri, taxonomies, and/or string-matching algorithms.

The model representation of the document is a TF-IDF document representation of the extracted information, and the clustering or machine learning includes a classifier based on decision trees, support vector machines (SVM), naïve-bayes classifiers, k-nearest neighbors, rules-based classification, Linear discriminant analysis (LDA), Maximum Entropy Markov Model (MEMM), scatter-gather clustering, and/or hierarchical agglomerate clustering (HAC).

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 14 illustrates an overview of structural, syntactical and semantic information that can be extracted from documents to represent feature vectors for machine learning;

FIG. 16 illustrates an overview of a bag-of-words (BOW) approach and creation of feature vectors for machine learning.

DETAILED DESCRIPTION OF THE PREFERRED EMBODIMENTS

Figure 1:
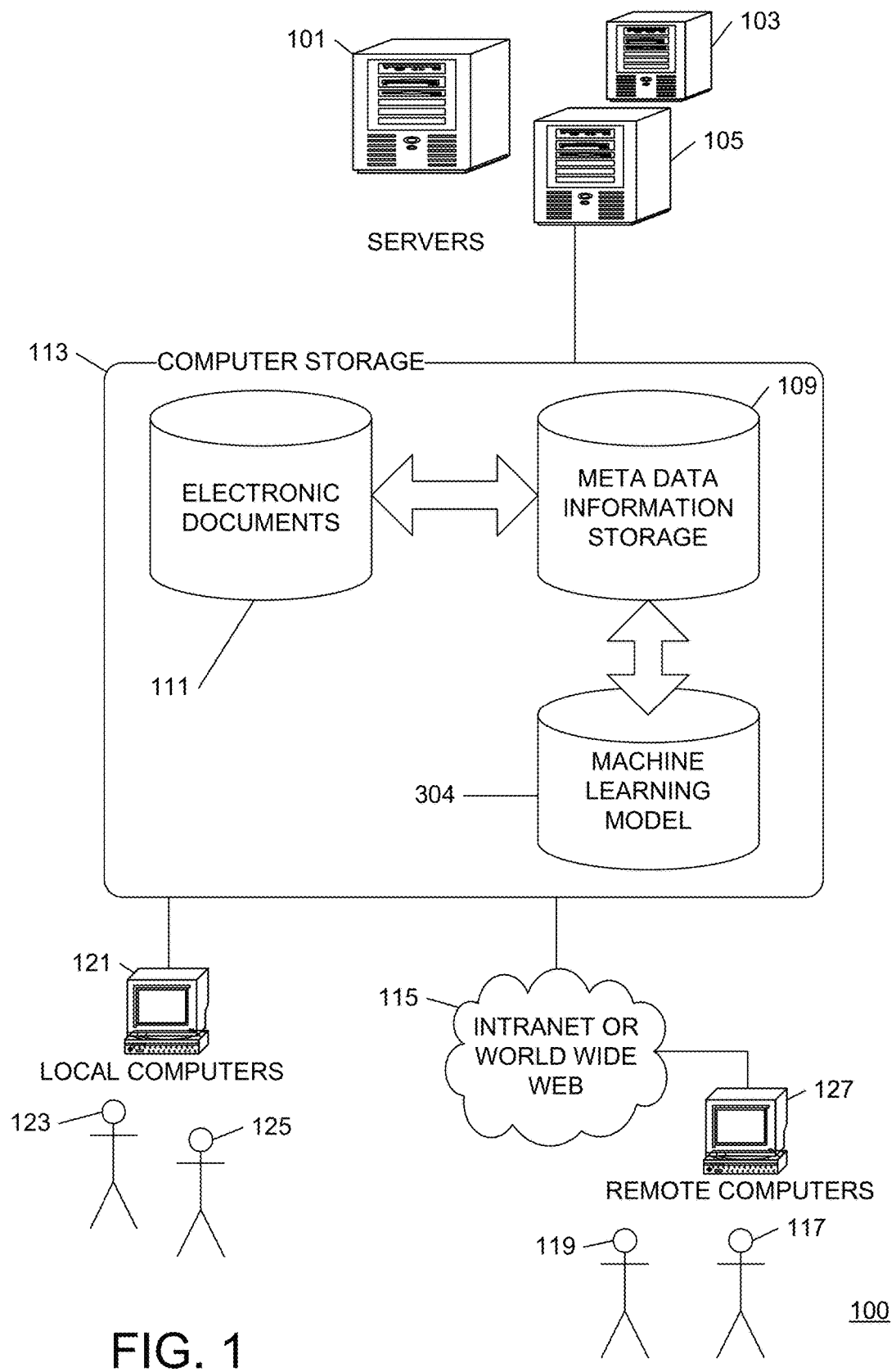
FIG. 1 illustrates a system for automatic document classification.

The present invention includes recognition that the ongoing information explosion is reaching epic proportions and has earned its own name: Big Data. Big Data encompasses both challenges and opportunities. The opportunity, as focused on by many parties, is to use the collective Big Data to predict and recognize patterns and behavior and to increase revenue and optimize business processes. But there is also a dark side to Big Data: requirements for eDiscovery, compliance, legacy-information clean-up, governance privacy and storage can lead to enormous costs and unexpected or unknown risks. New data formats (e.g., multimedia, in particular), different languages, cloud and other off-side locations and the continual increase in regulations and legislation—which may contradict previous protocols—add even more complexity to this puzzle.

Applying content analytics helps to assuage the dark side of Big Data. Content analytics such as text-mining and machine-learning technology from the field of artificial intelligence can be used very effectively to manage Big Data. Consider tasks, for example, such as identifying exact and near-duplicates, structuring and enriching the content of text and multimedia data, identifying relevant (e.g., semantic) information, facts and events, and ultimately, automatically clustering and classifying information, and the like.

Content-analytics can be used for any suitable type of application where unstructured data needs to be classified, categorized or sorted. Other examples are early-case assessment and legal review in eDiscovery (e.g., also known as machine-assisted review, technology-assisted review or predictive coding), enforcement of existing rules, policies and regulations in compliance. But also identifying privacy-sensitive information, legacy-information clean-up and information valuation in enterprise information management are good examples. As a result of these content analytics efforts, users can explore and understand repositories of Big Data better and also apply combinations of advanced search and data visualization techniques easier.

Both supervised and unsupervised machine learning techniques can be used to classify documents automatically and reveal more complex insights into Big Data. A machine learning model can be trained with a seed set of documents (e.g., samples), which are often annotated documents for particular information categories or known information patterns. Based on these training documents, a machine learning algorithm can derive a model that can classify other documents into the thought classes, or temporal, geographical, correlational or hierarchical patterns can be identified from these training examples.

Machine learning is not perfect: the more document categories there are, the lower the quality can be for the document classification. This is very logical as it is easier to differentiate only black from white than it is to differentiate 1,000 types of gray values. The absence of sufficient relevant training documents will also lower the quality of classification. The number of required training documents grows faster than the increase of the number of categorization classes. So, for 2 times more classes one may need 4 times more training documents.

Machine learning and other artificial intelligence techniques used to predict patterns and behavior are not based on "hocus pocus": they are based on solid mathematical and statistical frameworks in combination with common-sense or biology-inspired heuristics. In the case of text-mining, there is an extra complication: the content of textual documents has to be translated, so to speak, into numbers (e.g., probabilities, mathematical notions such as vectors, etc.) that machine learning algorithms can interpret. The choices that are made during this translation can highly influence the results of the machine learning algorithms.

During a pre-processing step, the documents can be converted into a manageable representation. Typically, they are represented by so-called feature vectors. A feature vector can include a number of dimensions of features and corresponding weights. The process of choosing features for the feature vector is called feature selection. In text representation, the commonly used representation can be referred to as a bag-of-words (BOW), where each word is a feature in the vector and the weights are either 1 if the word is present in the document or 0 if not. More complex weighting schemes are, for example, Term Frequency-Inverse Document Frequency (TF-IDF), and the like, which gives different weights based on frequency of words in a document and in the overall collection. The TF-IDF approach provides a numerical measure of the importance of a particular word to a document in a corpus of documents. The advantage of this technique is that the value increases proportionally to the number of times the given word occurs in the document, but decreases if the word occurs more often in the whole corpus of documents. This relates to the fact that the distributions of words in different languages vary extremely.

The bag-of-word model has several practical limitations, for example, including: (1) typically, it is not possible to use the approach on documents that use different languages within and in-between documents, (2) machine-learning models typically cannot be re-used between different cases, one has to start all over again for each case, (3) the model typically cannot handle dynamic collections, when new documents are added to a case, one has to start all over again, (4) when the model does not perform relatively good enough, one has to start training all over again with a better training set, (5) typically there is no possibility to patch the model, nor is there a guarantee to success, and (6) in application where defensibility in court and clarity are important, such as eDiscovery, compliance, legacy-information clean-up, and the like, an additional complication of the bag-of-word approach is that it is hard to understand and explain to an audience laymen's terms.

The bag-of-word model also has several technical limitations that may result in having completely different documents ending up in the exact same vector for machine learning and having documents with the same meaning ending up as completely different vectors. Also, the high-dimensional feature vectors are very sparse, that is, most of the dimensions can be (e.g., close to) zero. This opens up the opportunity for data compression, but also causes machine learning problems, such as a very high computational complexity, resulting in relatively huge memory and processing requirements, over-fitting (e.g., random error and noise in the training set is used instead of the actual underlying relationships to derive the machine learning model from the training examples), rounding errors (e.g., multiplying very small probabilities over and over again may result in a floating-point underflow), and the like.

Moreover, a most serious structural limitation of the bag of word approach is, that all suitable words (e.g., maybe with the exception of a list of high frequency noise words) are more or less dumped into a mathematical model, without additional knowledge or interpretation of linguistic patterns and properties, such as word order (e.g., "a good book" versus "book a good"), synonyms, spelling and syntactical variations, co-references and pronouns resolution or negations, and the like. Therefore, the bag of words approach takes simplicity one step too far. For example, just a few of the examples of the problems and limitations can include: (1) Variant Identification and Grouping: It is sometimes needed to recognize variant names as different forms of the same entity giving accurate entity counts as well as the location of all suitable appearances of a given entity. For example, one may need to recognize that the word "Smith", in an example, refers to the "Joe Smith" identified earlier and therefore groups them together as aliases of the same entity. (2) Normalization: Normalizes entities such as dates, currencies, and measurements into standard formats, taking the guesswork out of the metadata creation, search, data mining, and link analysis processes. (3) Entity Boundary Detection: Will the technology consider "Mr. and Ms. John Jones" as one or two entities? And what will the processor consider to be the start and end of an excerpt, such as "VP John M. P. Kaplan-Jones, Ph.D. M.D."?

Such basic operations will not only dramatically reduce the size of the data set, they will also result in better data analysis and visualization: entities that would not be related without normalization can be the missing link between two datasets especially if they are written differently in different parts of the data set or if they are not recognized as being a singular or plural entity properly. In addition, one of the other limitations of the usage of a bag-of-word approach is the absence of the resolving of the so called anaphora and co-references. This is the linguistic problem to associate pairs of linguistic expressions that refer to the same entities in the real world.

For example, consider the following text:

"A man walks to the station and tries to catch the train. His name is John Doe. Later he meets his colleague, who has just bought a card for the same train. They work together at the Rail Company as technical employees and they are going to a meeting with colleagues in New York."

The text can include various references and co-references. Various anaphora and co-references can be disambiguated before it is possible to fully understand and extract the more complex patterns of events. The following list shows examples of these (e.g., mutual) references:

Pronominal Anaphora: he, she, we, oneself, etc.

Proper Name Co-reference: For example, multiple references to the same name.

Apposition: the additional information given to an entity, such as "John Doe, the father of Peter Doe".

Predicate Nominative: the additional description given to an entity, for example "John Doe, who is the chairman of the soccer club".

Identical Sets: A number of reference sets referring to equivalent entities, such as "Giants", "the best team", and the "group of players" which all refer to the same group of people.

It can be stated that natural language is not a jumbled bag of words; ignoring simple linguistic structures, such as synonyms, spelling and syntax variations, co-references and pronouns resolution or negations, and the like. As a result, machine learning based on the so-called bag-of-words feature extraction is limited from its start. To many end users in eDiscovery, Governance, Enterprise Information Archiving and other Information Management initiatives, such built-in limitation is unacceptable.

Even with limited natural language processing (NLP) techniques, one can be able to do a better job than the bag-of-words approach and recognize and disambiguate much more relevant linguistic information and build better feature vectors for the machine-learning process. As a result of this, the overall performance of the machine-learning system can easily be increased.

Documents are represented by extracted semantic information, such as (e.g., named) entities, properties of entities, noun-phrases, facts, events and other high-level concepts, and the like. Extraction is done by using any known techniques from text-mining, for example: language identification, gazetteers, regular expressions, noun-phrase identification with part-of-speech taggers, statistical models and rules, and the like, to identify more complex patterns. These patterns, libraries, algorithms, and the like, can be shared among cases, but can also be fine-tuned for a specific case, so only case-specific relevant semantic information is extracted. Extracted information can be normalized by using any suitable type of known technique, for example, including normalization rules, groupers, thesauri, taxonomies, string-matching algorithms, and the like.

Next, instead of using the bag-of-word, TF-IDF document representation, vectors built of the normalized and extracted semantic information are used as feature vectors for any suitably known supervised or unsupervised clustering and machine learning technique. Examples of machine-learning algorithms that can be used include Decision Trees, Support Vector Machines (SVM), Naïve-Bayes Classifiers, k-Nearest Neighbors, rules-based classification, Scatter-Gather Clustering, r Hierarchical Agglomerate Clustering, (HAC), and the like.

This approach has several benefits over the bag-of-word approach: (1) the dimensionality of the derived feature vectors are orders of a magnitude smaller than the bag-of-words feature vectors. As a result, machine-learning training can be much faster (e.g., which is a huge benefit for dynamic collections), compression need not be employed (e.g., with the risks of information-loss), and the risks for over-fitting and rounding errors are relatively much smaller to non-present. The system can also handle document collections with very different document types better than a bag-of-word approach (e.g., very different length, structure, writing style, vocabulary, sentence length, etc.). (2) It is possible to use this approach on documents that use different languages within and in-between documents: extracted semantic information can be translated by using machine translation and multi-lingual glossaries. (3) Different documents need not end up as similar feature vectors for machine learning: machine-learning feature vectors can be relatively much better because of the application, understanding and resolution of basic linguistic operations such as normalization, negation, and co-reference/anaphora resolution. As a result, the performance of the machine learning can easily increase with double digit percentages. (4) There is a significant chance that the derived machine-learning models can be re-used between different cases, as they are based on high-level semantic information that need not rely on the actual words used in the original documents, as a result, one need not have to start all over again for each case. (5) Feature vectors can be built for specific types of cases by extracting only suitable information that is relevant for the case. This can make machine learning more defensibility in court and create more clarity in applications, for example, such as eDiscovery, compliance, legacy-information clean-up, and the like.

Referring now to the drawings, wherein like reference numerals designate identical or corresponding parts throughout the several views, and more particularly to FIG. 1 thereof, there is illustrated an automatic document classification system 100, according to an illustrative embodiment. In FIG. 1, generally, the automatic document classification system 100 provides for automatically extracting structural, semantic, syntactic, and the like, information from relevant training models, based on, for example, entities, facts, events, concepts, and the like, to train a machine learning model, and the like, and use the derived machine learning model for automatic document classification, and the like.

The system includes for example, a document storage 113 (e.g., a computer storage device, etc.) including one or more document collections 111, one or more document meta data information storage 109 and one or more machine learning models 304, accessed through one or more servers 101, 103 and 105. The system 100 can be used for (1) automatic extraction of structural, semantic, and syntactic information from relevant training models, for example, based on entities, facts, events, concepts, and the like, (2) training of a machine learning model, and the like, and (3) using the derived machine learning model for automatic document classification, and the like, into various trained categories, and the like.

One or more local computers 121 can provide connectivity to one or more users 123 and 125, for example, via a local-area network (LAN), and the like. Similarly, one or more remote computers 127 can provide connectivity to one or more remote users 117 and 119, for example, via the Internet, an Intranet, a wide-area network (WAN) 115, and the like. Accordingly, the computers 121 and 127 connect to the document storage 113 and to allow the one or more users 123, 125, 119 and 117 to manually or automatically access the document collection 111, view documents, document groups, document meta information, training documents, training results, the machine learning model, document classifications, and the like.

The servers 101, 103 and 105 communicate with the computer storage 113 to extract meta data information 109 for each document in the document collection 111, to create unique document identifiers for each document, to label the document meta data 109 with the document identifiers of the document groups, to create a machine learning model 304, and to automatically train the machine learning model 304 and use this machine learning model 304 for automatic document classification of other documents (e.g., documents not used for training the machine learning model), test the quality of the machine learning model 304 with pre-labeled test documents from the document collection 111, and the like.

As described above, the users 123, 125, 119 and 117 can access the document collection 111 by using the computers 121 and 127 connected over a LAN or the Internet or Intranet 115. When a document is found, the system can show the content of the documents 111, the meta information of the documents in the meta information storage 109, the training documents (e.g., selection from 111), the machine learning model 304, and the labels of the automatically categorized documents from 111 in the meta data storage 109.

Figure 2:
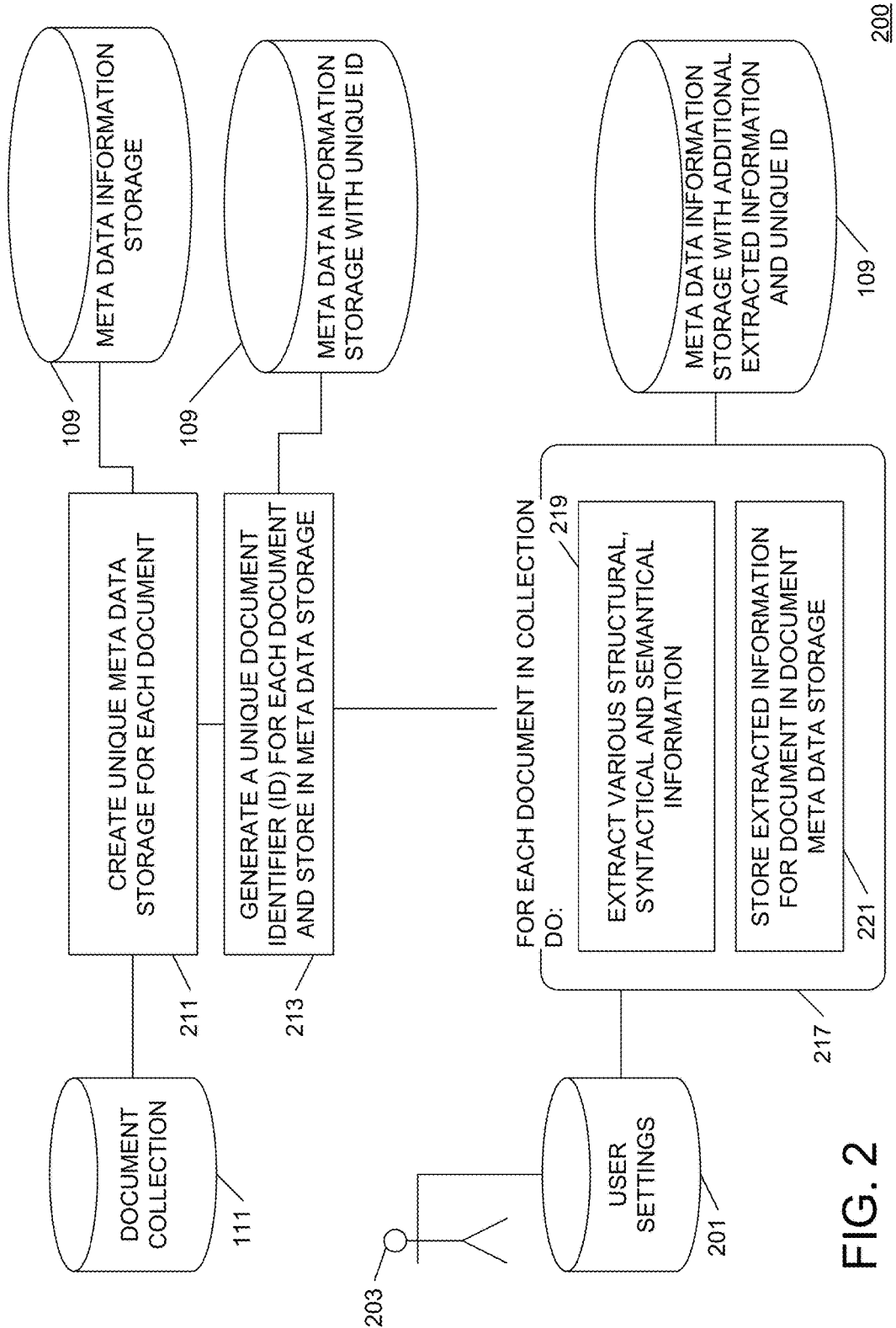
FIG. 2 illustrates a process of assignment of a unique identifier per document and extraction and storage of various structural, syntactical and semantic information from each individual document.

FIG. 2 illustrates a process 200 of the assignment of a unique identifier per document and the extraction, and the storage of various types of structural, syntactical and semantic information from each individual document. In FIG. 2, at step 211, for each document from the document collection 111, a record in the meta information storage 109 is created and stored. At step 213, for each document in the document collection 111, a unique document identifier (ID), for example, such as a unique serial number, a MD-5, SHA-1, SHA-2, SHA-128 hash value, and the like, is created. The unique identifier is stored in a record in the meta data information storage 109 that belongs to the corresponding document in the document collection database 111. At step 217, for each document in the document collection 111, various types of structural, syntactic, and semantic information is extracted by using certain user setting from a database 201, as set by using various information extraction techniques by, for example, a user or a group of users 203. In step 221, the extracted information is stored in a record in the meta data information storage 109 that belongs to the corresponding document in the document collection database 111.

Figure 3:
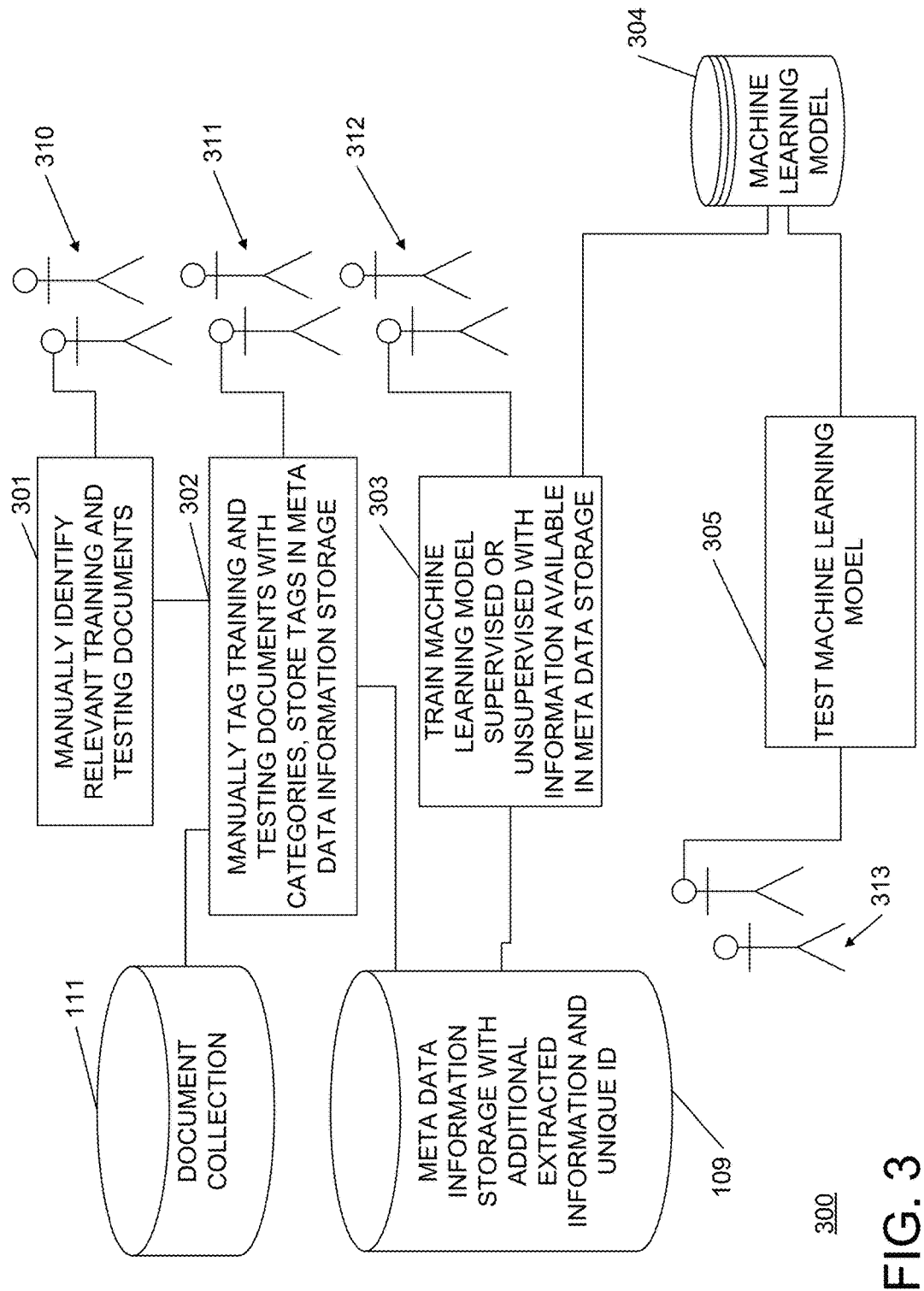
FIG. 3 illustrates a machine learning process with training and testing of a machine learning model.

FIG. 3 illustrates a machine learning process 300 with training and testing of the machine learning model. At step 301, a user or a group of users 310 manually or otherwise identify a set of relevant training and testing documents from the document collection 111. The set of training documents need not include documents in common with the set of testing documents. These sets can be mutually exclusive. Selection of relevant training material can also be done by using clustering or concept search techniques that cluster similar documents for certain document categories, for example, by self-organization or vector decomposition techniques (e.g., Hierarchical Clustering algorithms, Kohonen Self-Organizing maps, linear discriminant analysis (LDA), etc.), and the like.

At step 302, a user or a group of users 311 manually or otherwise tag the selected training and testing documents from document collection 111 with the corresponding document categories. At step 303, the machine learning model 304 is trained by using a vector representation created from the records with the extracted information for each document in the meta information storage 109, together with the document categorization label, which exists for each document from the training set in the document collection database 111. Both supervised as unsupervised machine learning algorithms can be used, for example, such as Support Vector Machines (SVM), k-Nearest Neighbor (kNN), naïve Bayes, Decision Rules, k-means, Hierarchical Clustering, Kohonen self-organizing feature maps, linear discriminant analysis (LDA), and the like.

At step 305, the machine learning model 304 is tested by comparing recognized categories with pre-labeled categories from documents in the test documents in document database 111. This testing can be done by a user or a user group 313. Results of step 305 can be reported for example in terms of precision, recall, f-values, and the like, and other best practice measurements from the fields of information retrieval, and the like.

Figure 4:
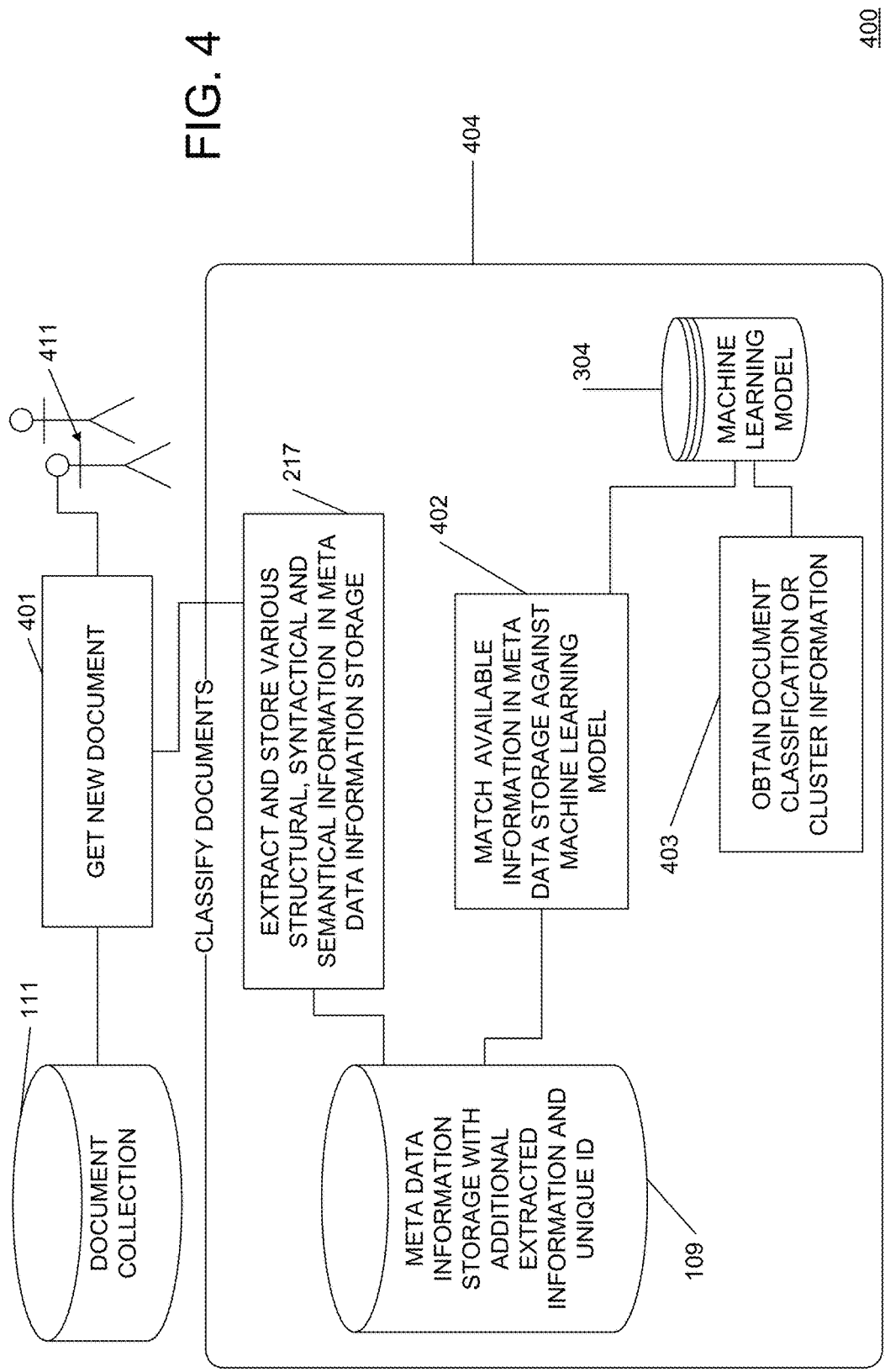
FIG. 4 illustrates an automatic classification process of new documents with a machine learning model.

FIG. 4 illustrates an automatic classification process 400 of new documents with the machine learning model 400. At step 401, a non-classified document is selected from document collection 111. This can be a document that is also not part of the training or test set of documents used in 300. Accordingly, in process 404, documents are classified. Process 404 includes a number of steps. For example, at step 217, the various structural, syntactical and semantic information for the selected document is obtained from the meta data information store. This information is converted into a vector representation in step 402 and then matched against the machine learning model 304. From the machine learning model 304, a document category or classification is obtained in step 403.

Figure 5:
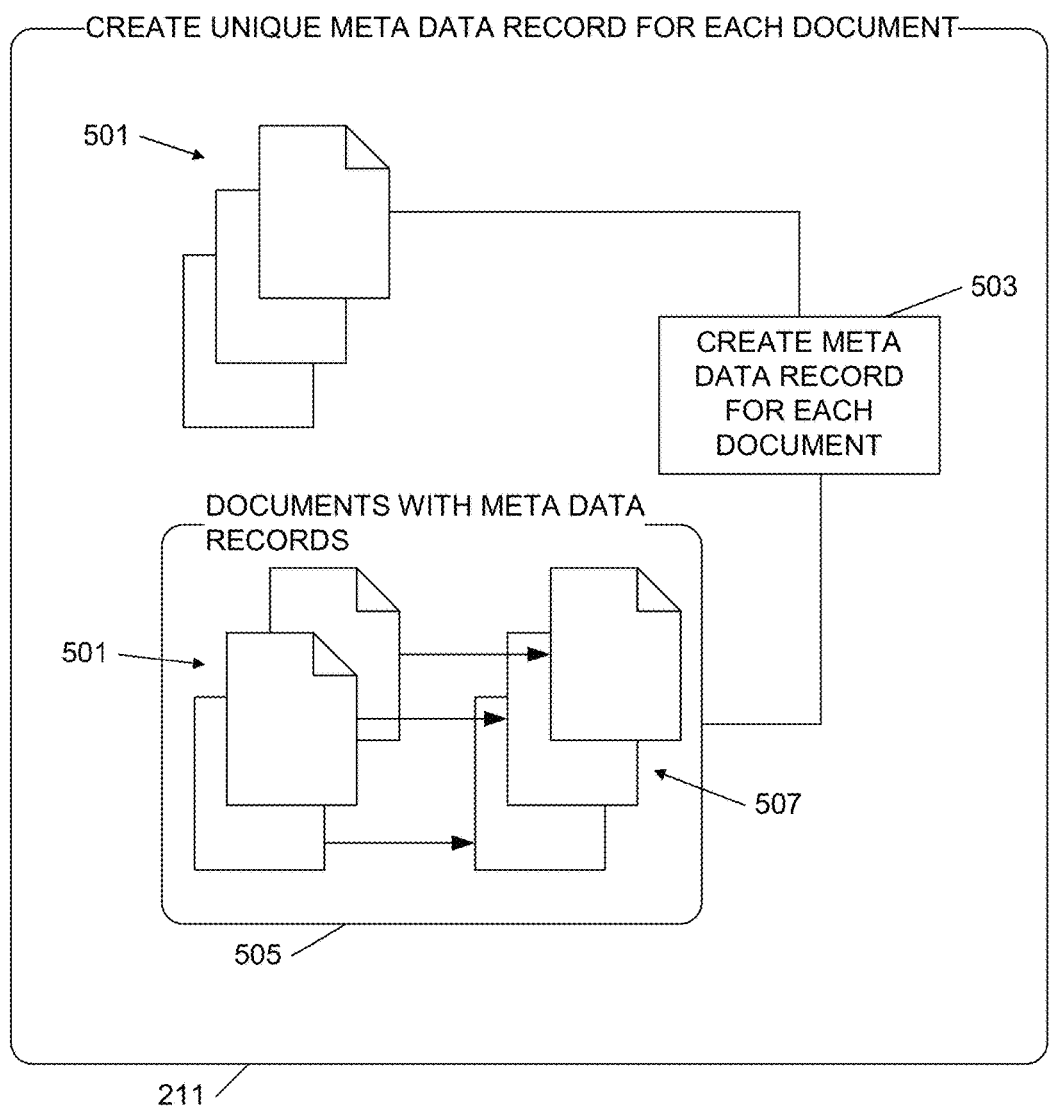
FIG. 5 illustrates a process to create a meta data record for each document.

FIG. 5 illustrates a process 500 explaining in more detail step 211 from process 200 to create a meta data record for each document. In FIG. 5, for each document or set of documents 501, which originate from the document collection database 111, a meta data record is created in step 503. Each document 501 can hold a unique corresponding meta data record 507, for example, illustrated as documents with linked meta data records in 505.

Figure 6:
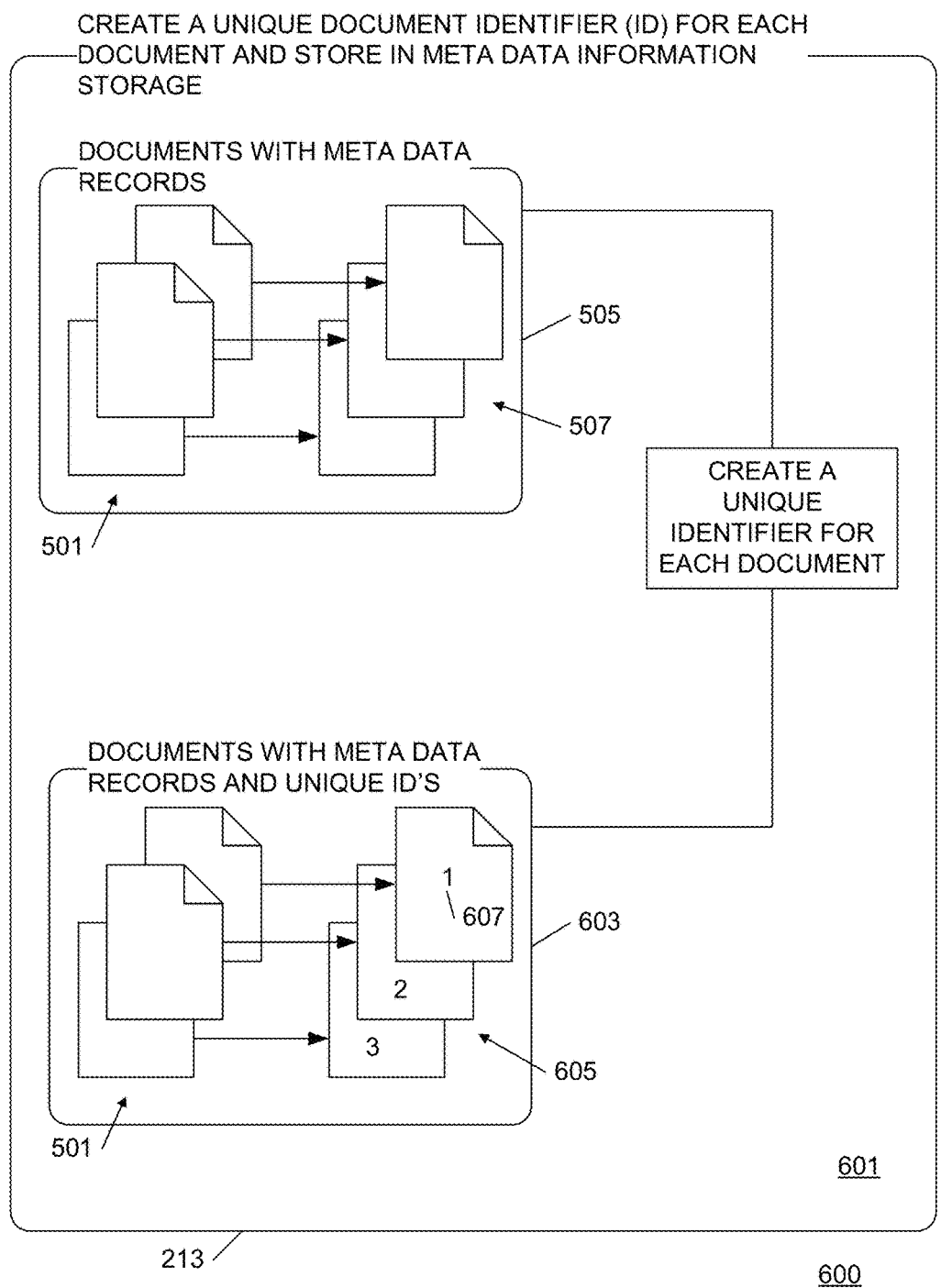
FIG. 6 illustrates a process to create a unique document identifier (ID) for each document and store the ID in meta data information storage.

FIG. 6 illustrates a process 600 explaining in more detail step 213 from process 200 to create a unique document identifier (ID) for each document and store the ID in the meta data information storage. In FIG. 6, each document 501 holding a unique corresponding meta data record 507, illustrated as documents with meta data records in 505 and have associated therewith a unique identifier, for example, such as a unique serial number, a MD-5, SHA-1, SHA-2, SHA-128 hash value, and the like, representing the document. Each document 601 can include a unique corresponding meta data record with a unique identifier 607, for example, illustrated as documents with linked meta data records in 603.

Figure 7:
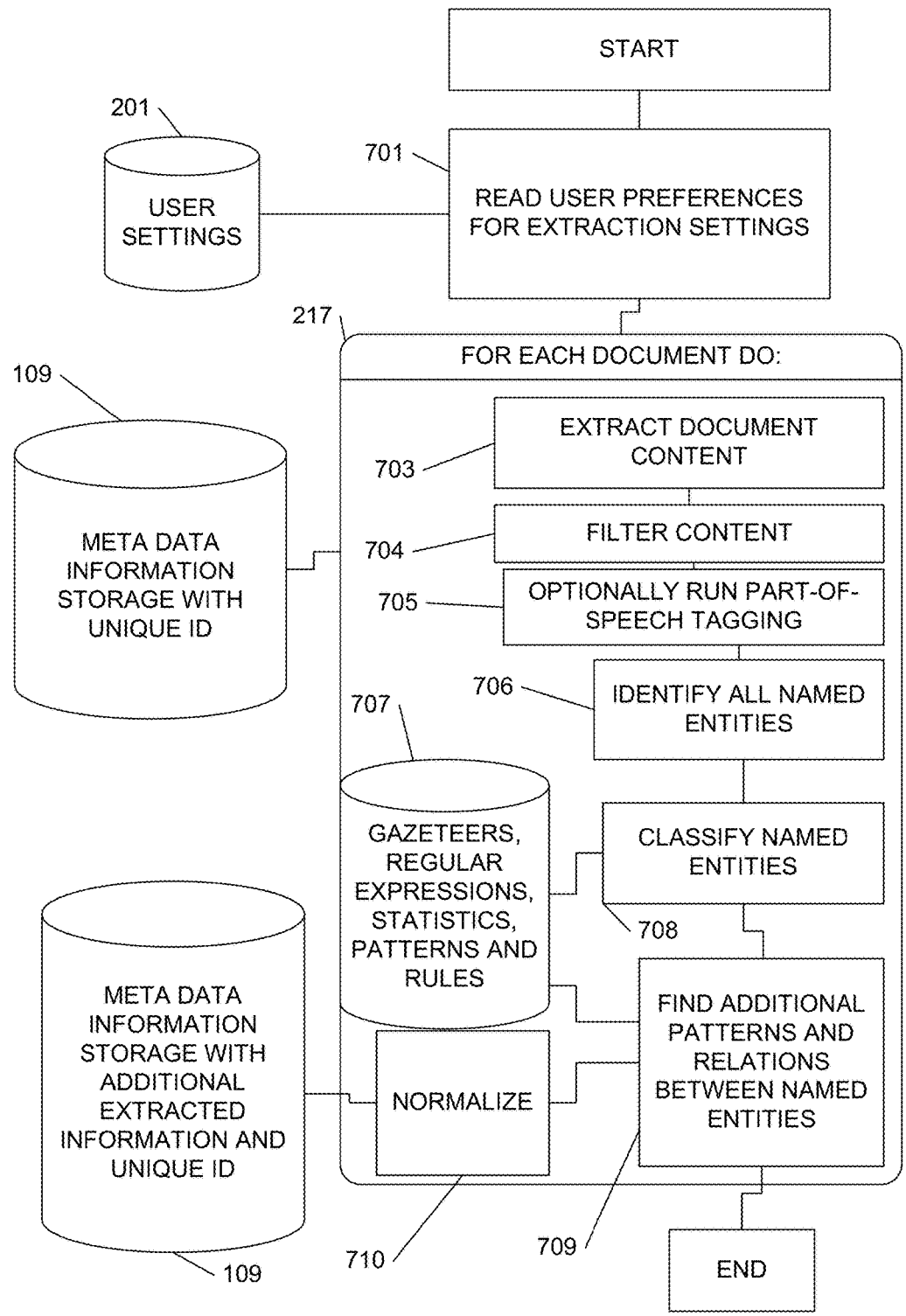
FIG. 7 illustrates a process to extract and store various structural, syntactical and semantic information from a document.

FIG. 7 illustrates a process 700 to extract and store various types of structural, syntactical and semantic information from a document, and explaining in more detail step 217 from process 200. In FIG. 7, after starting the process, step 701 reads user preferences related to the information extraction from user settings and preferences in database 201. At step 217, for each document, the document textual content is extracted at step 703, optionally, non-relevant information (e.g., such as numbers, reading signs, and other data that is not relevant to distinguish the document category) are filtered out at step 704, a language dependent part-of-speech tagging is implemented to assign a linguistic category to each word, for example, such as NOUN, VERB, DETERMINER, PRONOUN, ADVERB, PROPER NOUN, CONJUNCTION, and the like, and so as to find linguistic structures, for example, such as VERB PHRASES, NOUN PHASES, and the like.

Step 705 also can include automatic language recognition. Part-of-speech tagging is harder than just having a list of words and their parts of speech, because some words can represent more than one part of speech at different times, and because some parts of speech are complex or unspoken. This is not rare—in natural languages (e.g., as opposed to many artificial languages), a large percentage of word-forms are ambiguous. For example, even "dogs", which is usually thought of as just a plural noun, can also be a verb:

The sailor dogs the barmaid.

Accordingly, performing grammatical tagging can indicate that "dogs" is a verb, and not the more common plural noun, since one of the words must be the main verb, and the noun reading is less likely following "sailor" (e.g., sailor-!→dogs). Semantic analysis can then extrapolate that "sailor" and "barmaid" implicate "dogs" as (1) in the nautical context (e.g., sailor→<verb>←barmaid), and (2) an action applied to the object "barmaid" (e.g., [subject] dogs-→barmaid). In this context, "dogs" is a nautical term meaning "fastens (e.g., a watertight barmaid) securely; applies a dog to".

"Dogged", on the other hand, can be either an adjective or a past-tense verb. Just which parts of speech a word can represent varies greatly. Trained linguists can identify the grammatical parts of speech to various fine degrees depending on the tagging system. Schools commonly teach that there are nine parts of speech in English: noun, verb, article, adjective, preposition, pronoun, adverb, conjunction, and interjection. However, there are clearly many more categories and sub-categories. For nouns, plural, possessive, and singular forms can be distinguished. In many languages, words are also marked for their "case" (e,g, role as subject, object, etc.), grammatical gender, and so on; while verbs are marked for tense, aspect, and other things. Automatic part-of-speech tagging can be done by various techniques, for example, such as Hidden Markov Models (HMM), Finite State Grammars (FSG), Dependency Grammars and various other suitable types of linguistic parsers, and the like.

A proper linguistic grammatical analysis is very relevant to solve linguistic boundary problems (e.g., where does a named entity start and end and which parts of a sentence belong to the names entity, e.g., all words in "Mr. John D. Jones Ph.D. Jr." are all part of one entity) and to find if a named entity is one entity or a conjunction of entities (e.g., "Mr. and Mrs. Jones" are two entities, and "state university of New York" is one entity).

Grammatical analysis also helps resolving co-reference and pronoun ambiguity, which is advantageous for the machine learning later on. After the speech tagging in step 705, the named entities in a document can be obtained reliably in step 706. For each named entity, techniques, for example, such as gazetteers, dictionaries, regular expressions, rules, patterns, Hidden Markov Models, Support Vector Machines, Maximal Entropy Models and other suitable statistics, and the like, can be used to classify the named entities into structural, syntactic, semantic and pragmatic classes, for example, such as person, city, country, address, job title, credit card number, social security number, and the like, but also more complex relations, for example, such as sentiments, locations, problems, route, concepts, facts, events, and thousands more such roles and meanings, and the like, in step 709. In step 709, it is also advantageous to resolve the found co-references and pronouns and replace them by the value of the named entity that they refer to. For example, consider the following text:

"A man walks to the station and tries to catch a train. His name is Jan Jansen. Later he meets his colleague, who has just bought a ticket for the same train. They work together at the Rail Company as technical employees. They are going to a meeting with colleagues in Utrecht."

This sentence looks after co-references and pronoun resolution as follows:

A man <Jan Jansen> walks to the station and <Jan Jansen> tries to catch a train. His name is Jan Jansen. Later he<Jan Jansen> meets his colleague <John Johnson>, who <John Johnson> has just bought a ticket for the same train <as Jan Jansen>. His name is John Johnson. They <Jan Jansen and John Johnson> work together at the Rail Company as technical employees. They <Jan Jansen and John Johnson> are going to a meeting with colleagues in Utrecht.

Without co-reference and pronoun resolution, the following patterns would not have been detected and could not have been taught to the machine learning process:

<Jan Jansen> walks to the station, <Jan Jansen> tries to catch a train, <Jan Jansen> meets his colleague <John Johnson>, <John Johnson> has just bought a ticket for the same train <as Jan Jansen>, <Jan Jansen and John Johnson> work together at the Rail Company as technical employees, and <Jan Jansen and John Johnson> are going to a meeting with colleagues in Utrecht.

Based on the final purpose of the classification and machine learning problem, users can select what extracted information is most relevant for the application in step 707 and use this in the steps 708 and 709 before the data is entered into the machine learning model.

In step 710, all suitable entities are normalized, for example, including the following functions: normalization of entities such as names, dates, numbers and (e.g., email) addresses, have textual entities refer to the same real world object in a database, semantic normalization (e.g., meaning), resolve synonyms and homonyms, stemming of verbs and nouns. Normalization can reduce the number of unique entities by up to 80%. Normalization greatly improves the quality of the machine learning.

After normalization, the extracted information, which is a result of all the of the previous steps of step 217, for each document is stored in the meta data information storage 109.

Figure 8:
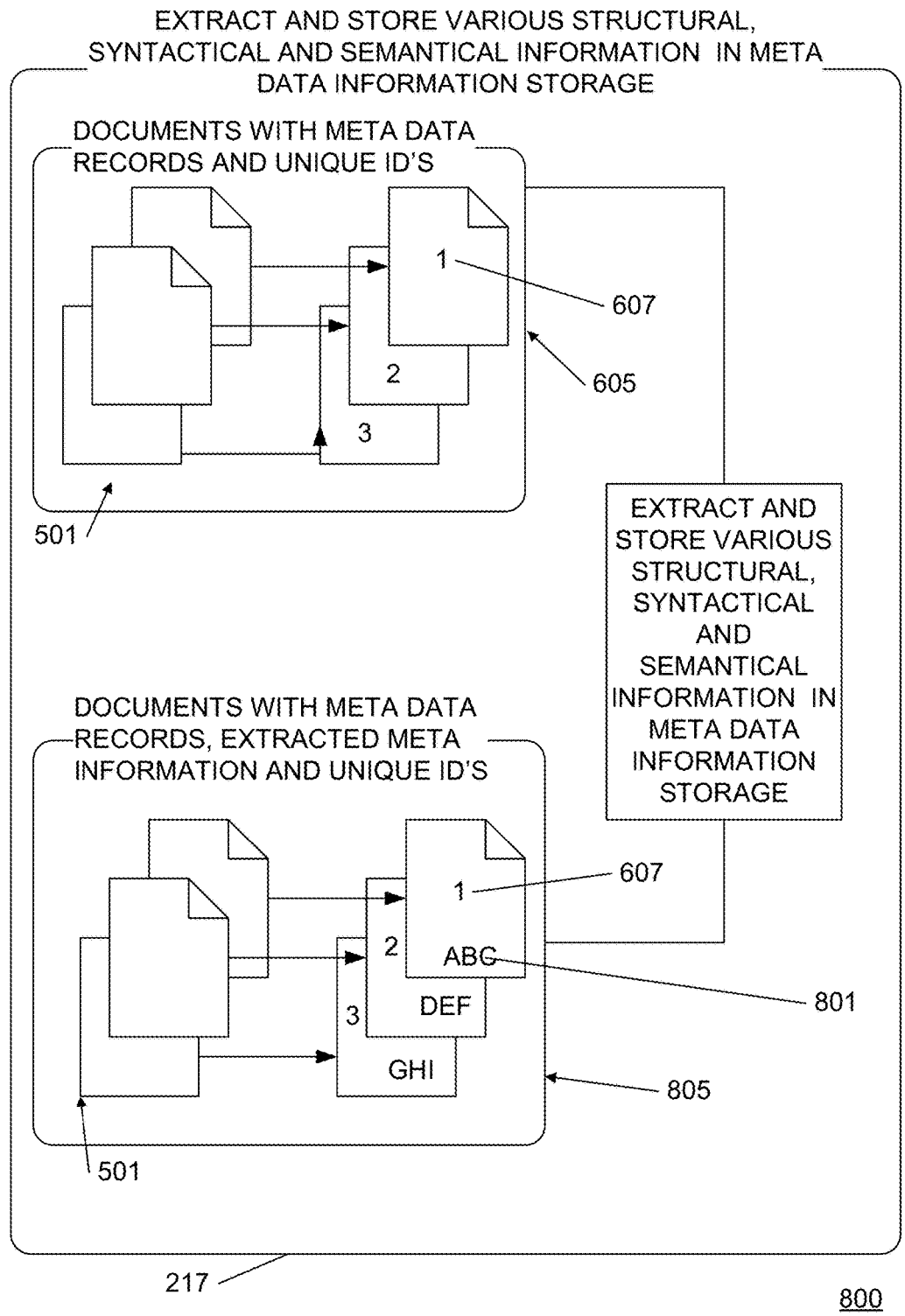
FIG. 8 illustrates a data structure to extract and store various structural, syntactical and semantic information from a document.

FIG. 8 illustrates a data structure to extract and store various types of structural, syntactical and semantic information from a document 800. In FIG. 8, step 217 is specified in more detail, and in particular as to how the extracted various types of structural, syntactical and semantic information is stored in the meta information data store. For each document 501, the additional structural, syntactical and semantic information 801 is stored in each unique record 607 linked to a document in sub-process 805.

Figure 9:
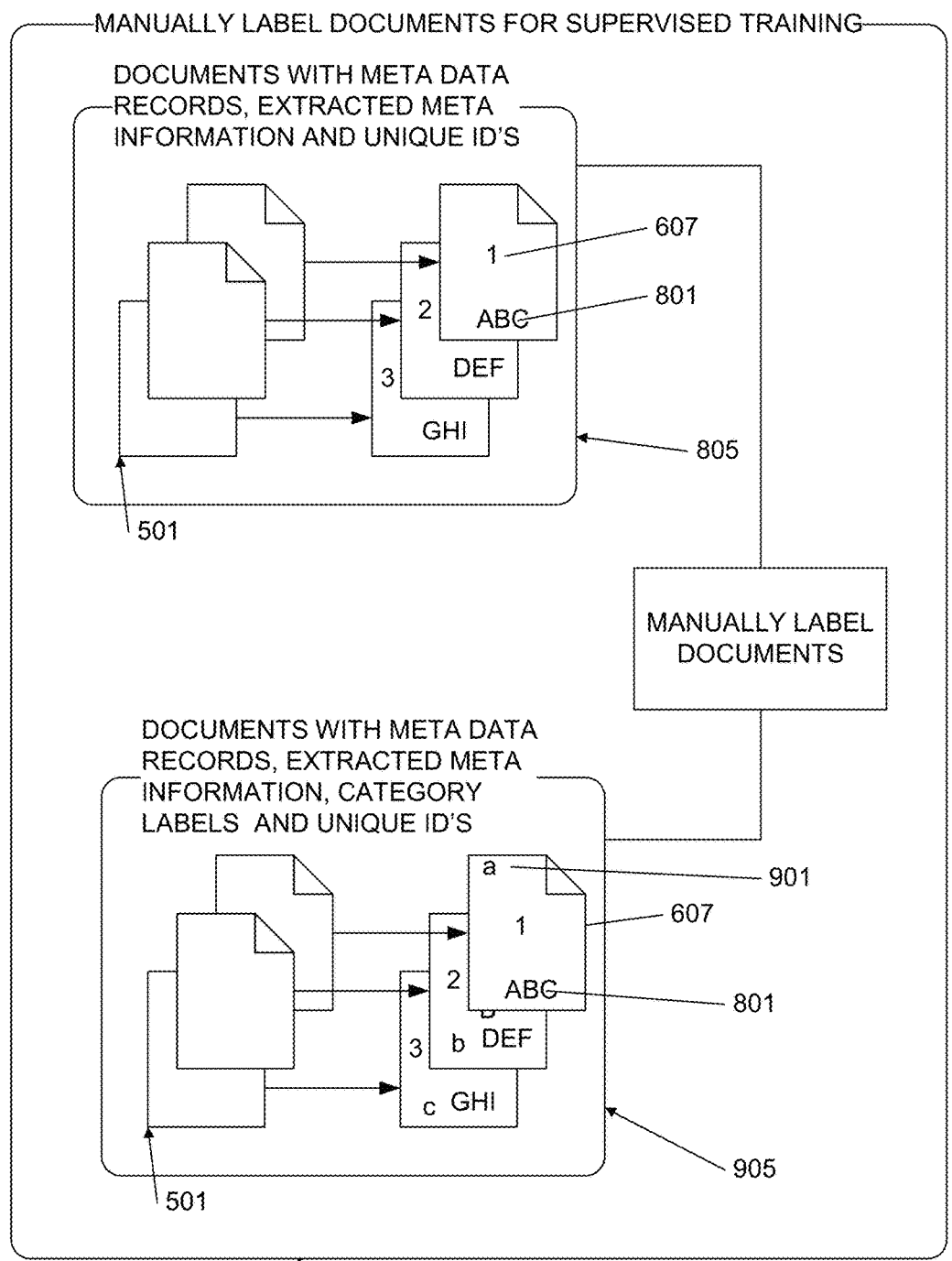
FIG. 9 illustrates a data structure to manually or otherwise label training and text documents for machine learning.

FIG. 9 illustrates a data structure 900 to manually label training and text documents for machine learning. In FIG. 9, step 302 is specified in more detail. For each class, or for a set of classes, a relevant set of training- and testing documents is selected by a user of a group of users using manual and/or automatic techniques, for example, such as intuition, statistics, cross validation, maximum likelihood estimation, clustering, self-organization, feature extraction and feature selection methods, and the like. Each document 501 is then labeled manually or otherwise with the class or classes 900 it belongs to. This additional information is stored in the unique record 607 that exists for each document 501 in sub-process 905.

Figure 10:
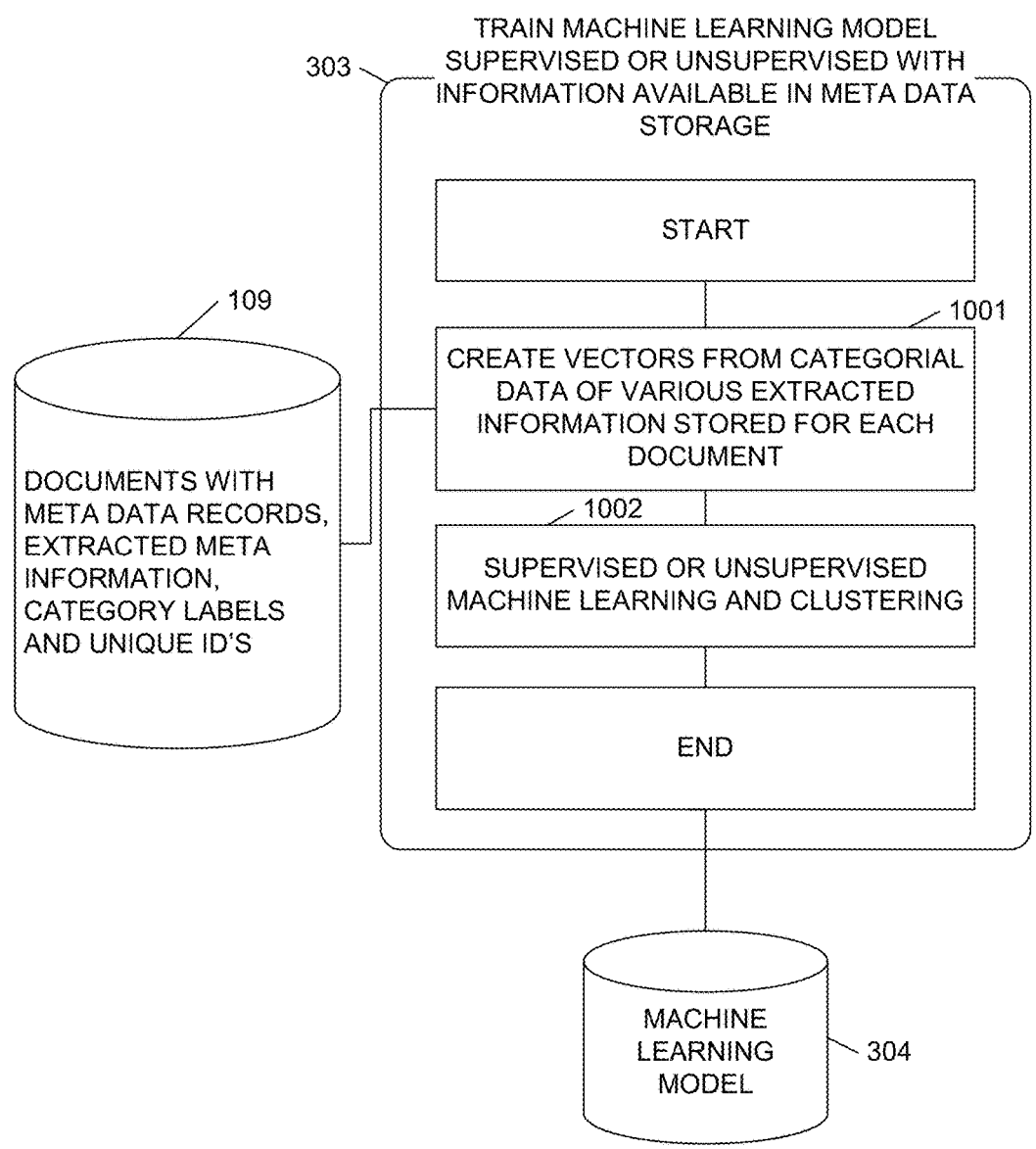
FIG. 10 illustrates a process to train a machine learning model with a supervised or unsupervised machine learning algorithm.

FIG. 10 illustrates a process to train the machine learning model with a supervised or unsupervised machine learning algorithm 1000. In FIG. 10, step 303 is explained in more detail. In order to train the machine learning model either supervised or on-supervised to predict the category of a document from the extracted meta data information, mathematical vectors can be created form the categorical data in step 1001 and as explained in more detail in FIG. 16. Next, these vectors are used as feature vectors for any known supervised or unsupervised clustering and machine learning technique, and the like, at step 1002. Machine-learning algorithms that can be used, for example, include Decision Trees, Support Vector Machines (SVM), Naïve-Bayes Classifiers, k-Nearest Neighbors, rules-based classification, Scatter-Gather Clustering, Latent Discriminant Analysis (LDA), or Hierarchical Agglomerate Clustering, (HAC), and the like. At the end of such a process, a machine learning model 304 is obtained that can be used for automatic document classification. The machine learning model 304 can be a binary classifier, with one trained classifier per category or a multi-class classifier trained to recognize multiple classes with one classifier, and the like.

Figure 11:
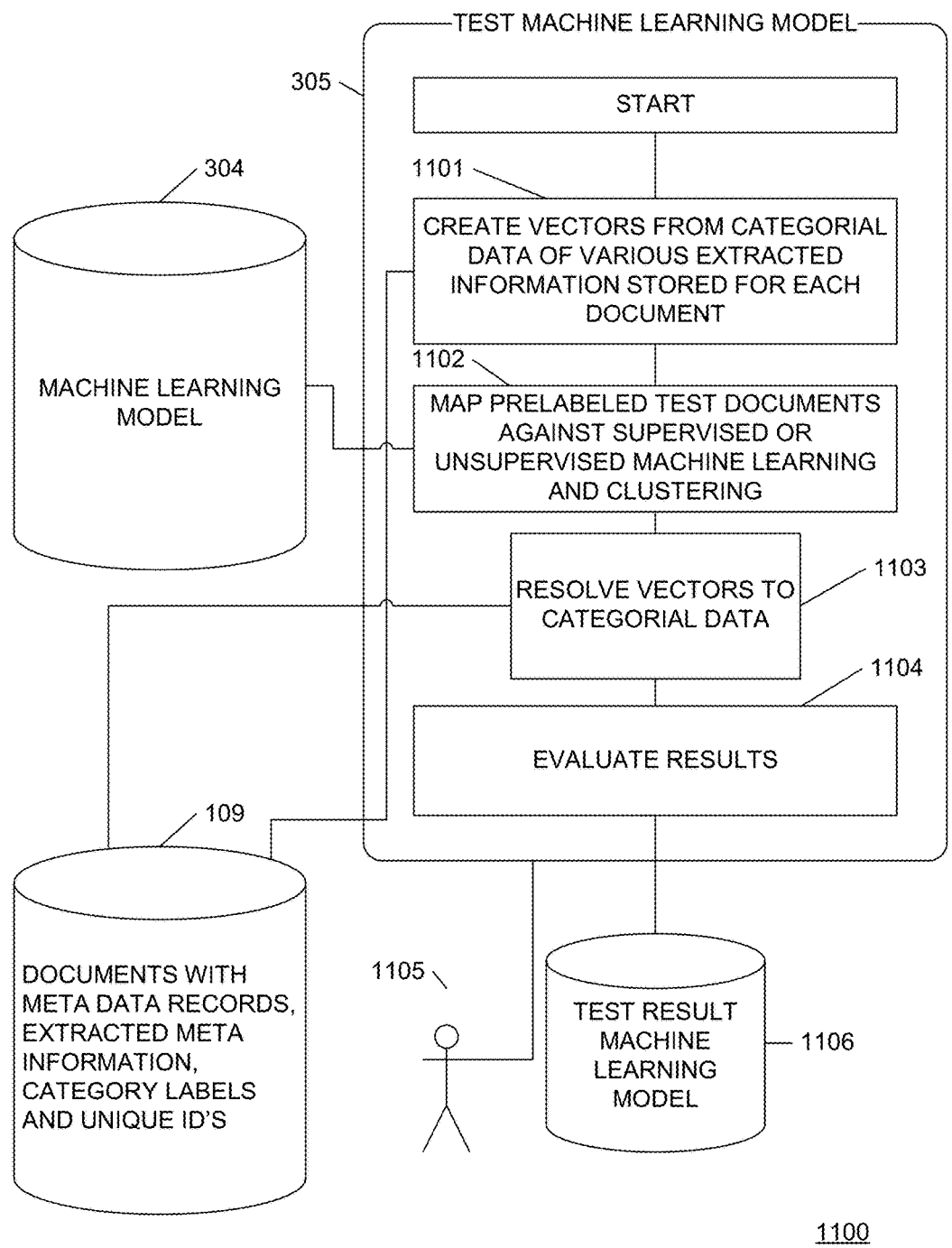
FIG. 11 illustrates a process to test a machine learning model for a supervised or unsupervised machine learning algorithm.

FIG. 11 illustrates a process 1100 to test the machine learning model for a supervised or unsupervised machine learning algorithm. In FIG. 11, step 305 for testing the machine learning model is explained in more detail. For each document in the test set, a feature vector is created from the extracted structural, syntactical and semantic information that is stored meta data records 109 for each test document in step 1101. In step 1102, this vector is then mapped against the machine learning model 304 and the machine learning model 304 returns a recognized document class.

When binary classifiers are used, the vector of the test document is compared to each classifier and a value representing the measure of recognition is returned. By using a (e.g., a user definable threshold), the test document can be included or excluded for one or more classes. The recognized classes are returned as one or more return values in a predefined range, for example, where higher values represent a match and lower values represent a miss-match with each category. In the case of a multi-class classifier, the values of the classes which are a best match for the vector of the test document are returned. In both cases, the name of the class(es) of the highest values returned, can be resolved by using information in 109 to a categorical value in step 1103.

Next, the recognized document class is compared to the pre-labeled document category in step 1104. A user or a group of users 1105 can then compare the results and obtain an overall set of test results representing the quality of the machine learning model in 1106. Test results, for example, can be expressed in terms of precision and recall, in a combination of precision and recall, and the like, for example, the so-called f-values of eleven points of precision based on an arithmetic average.

Figure 12:
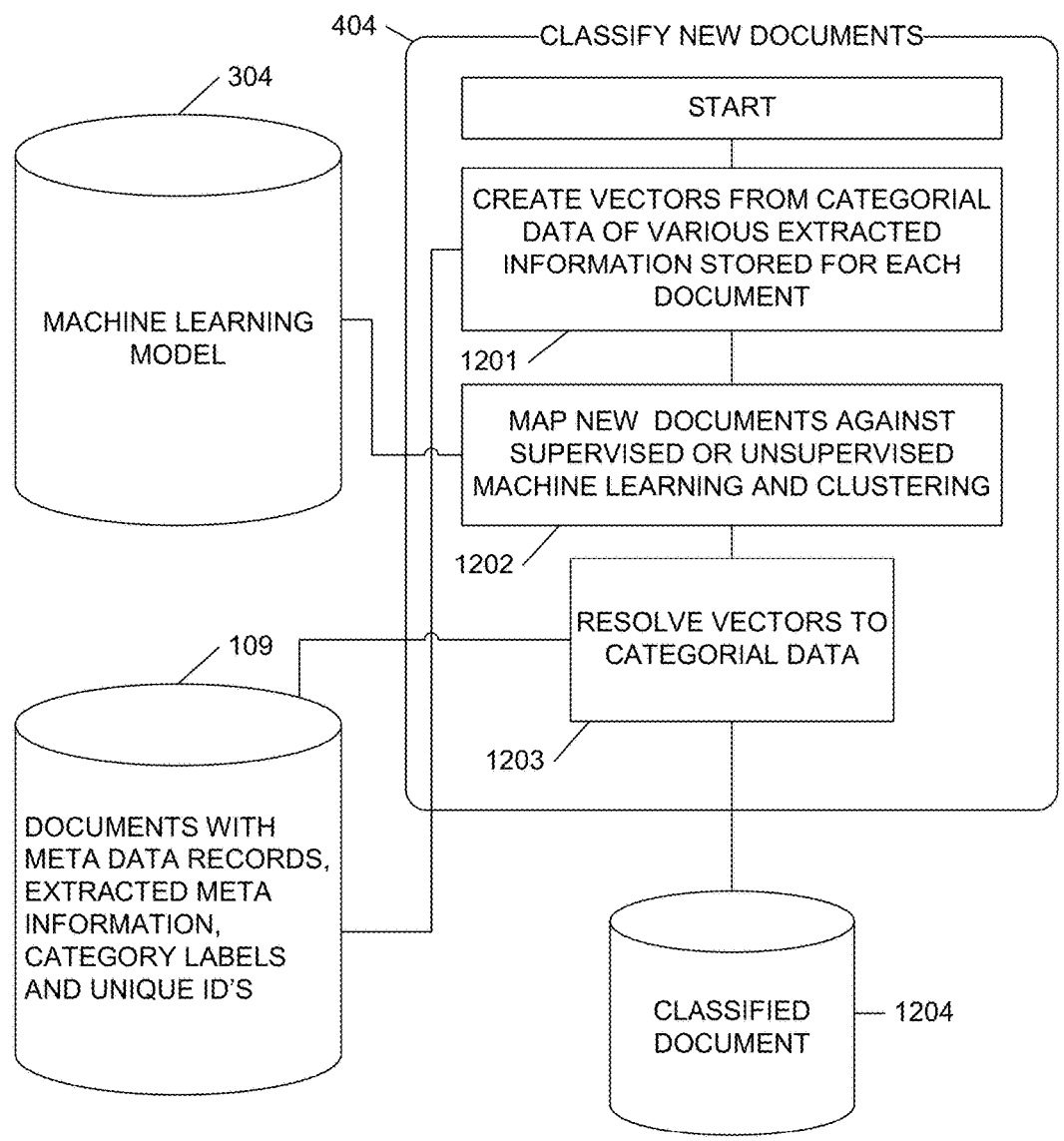
FIG. 12 illustrates a process to classify new documents with a machine learning model.

FIG. 12 illustrates a process 1200 to classify new documents with the machine learning model. In FIG. 12, step 404 is explained in more detail. For each document in the test set, a feature vector is created from the extracted structural, syntactical and semantic information that is stored meta data records 109 for each test document in step 1201. In step 1202, this vector is then mapped against the machine learning model 304 and the machine learning model 304 returns a recognized document class.

When binary classifiers are used, the vector of the test document is compared to each classifier and a value representing the measure of recognition is returned. By using a (e.g., a user definable threshold), the test document can be included or excluded for one or more classes. The recognized classes are returned as one or more return values in a predefined range, where higher values represent a match, and lower values represent a miss-match with each category. In the case of a multi-class classifier, the values of the classes which are a best match for the vector of the test document are returned. In both cases, the name of the class(es) of the highest values returned is resolved by using information in 109 to a categorical value in step 1203. The system then return the recognized document class(es) in step 1204.

Figure 13:
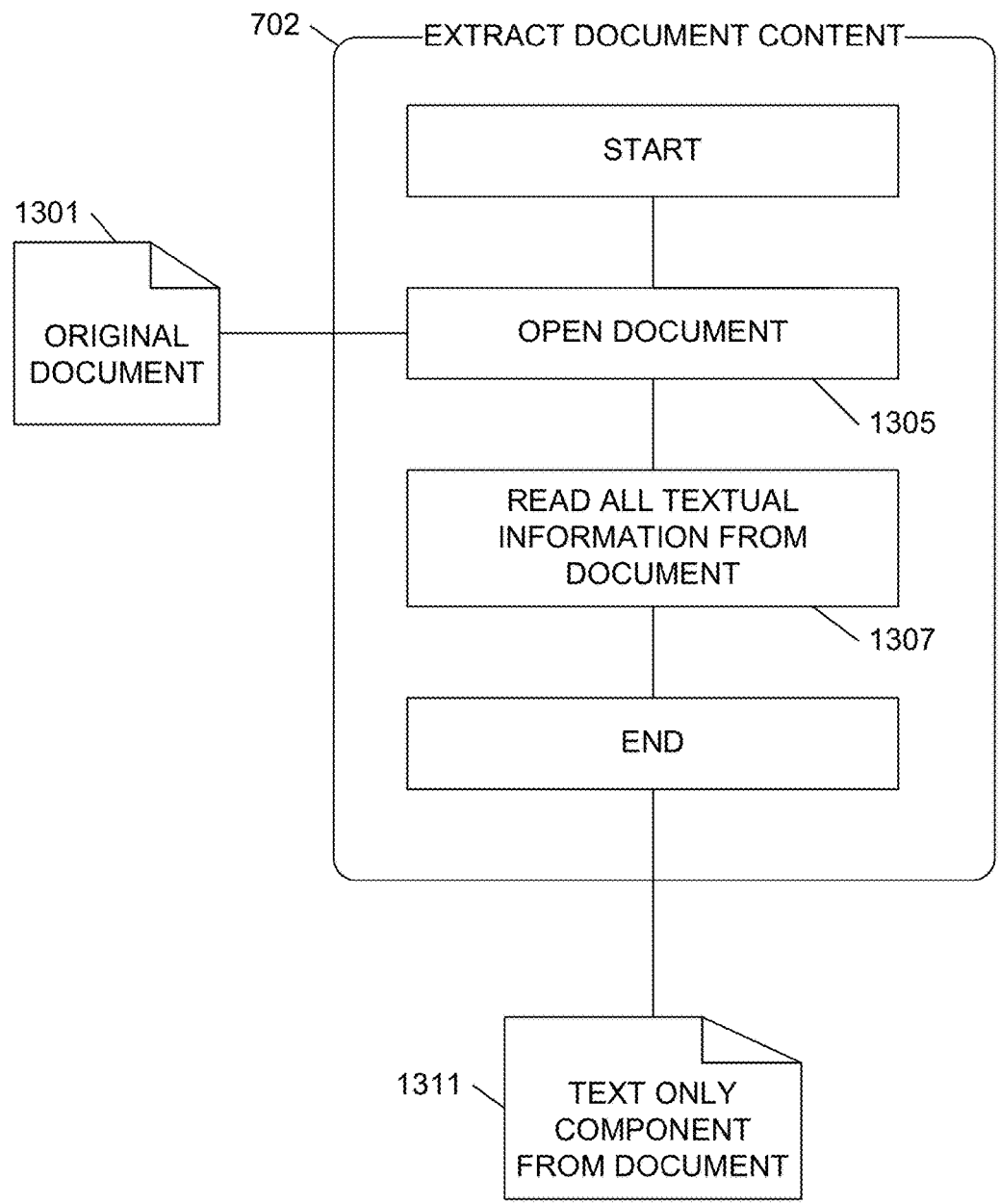
FIG. 13 illustrates a process to extract textual content from a document.

FIG. 13 illustrates a process 1300 to extract textual content from a document 1300. In FIG. 13, step 702 is explained in more detail. When the content of a document is extracted, the document is first opened in step 1305, and all suitable textual content is extracted from the document in step 1307. This also includes next to all suitable visible text and document layout, any suitable type of non-visible textual information, for example, such as file security, document properties, project properties, user information, file system and storage properties, and any other suitable type of hidden or meta data information, and the like. In the process 1300, low-level document encoding (e.g., UNICODE, Windows code pages, ASCII, ANSI, etc.) is resolved and normalized to one common text representation (e.g., often 16 bits UNICODE), and the sequence of the words (e.g., left-right for Roman-, right-left for Arabic-, and top-down for Asian languages), and layout sequence is normalized. The result is a uniform textual representation of all suitable textual content of a document in 1311.

FIG. 14 is an illustrative overview 1400 of structural, syntactical and semantic and information that can be extracted from documents to represent the feature vectors for machine learning. In FIG. 14, examples of named entities, such as CITY, COMPANY, COUNTRY and CURRENCY, and the like, but also more relatively complex patterns, such as sentiments, problems, and the like, can be derived. In principle, extracted information can be anything that is relevant, for example, structural, syntactical or semantic information, and the like, that is unique for a particular document class. Extracted information can include inference by rules, so if information type A and B occur in a document, then the system can inference that the document is about information C, and also tag the document with that value.

Figure 15:
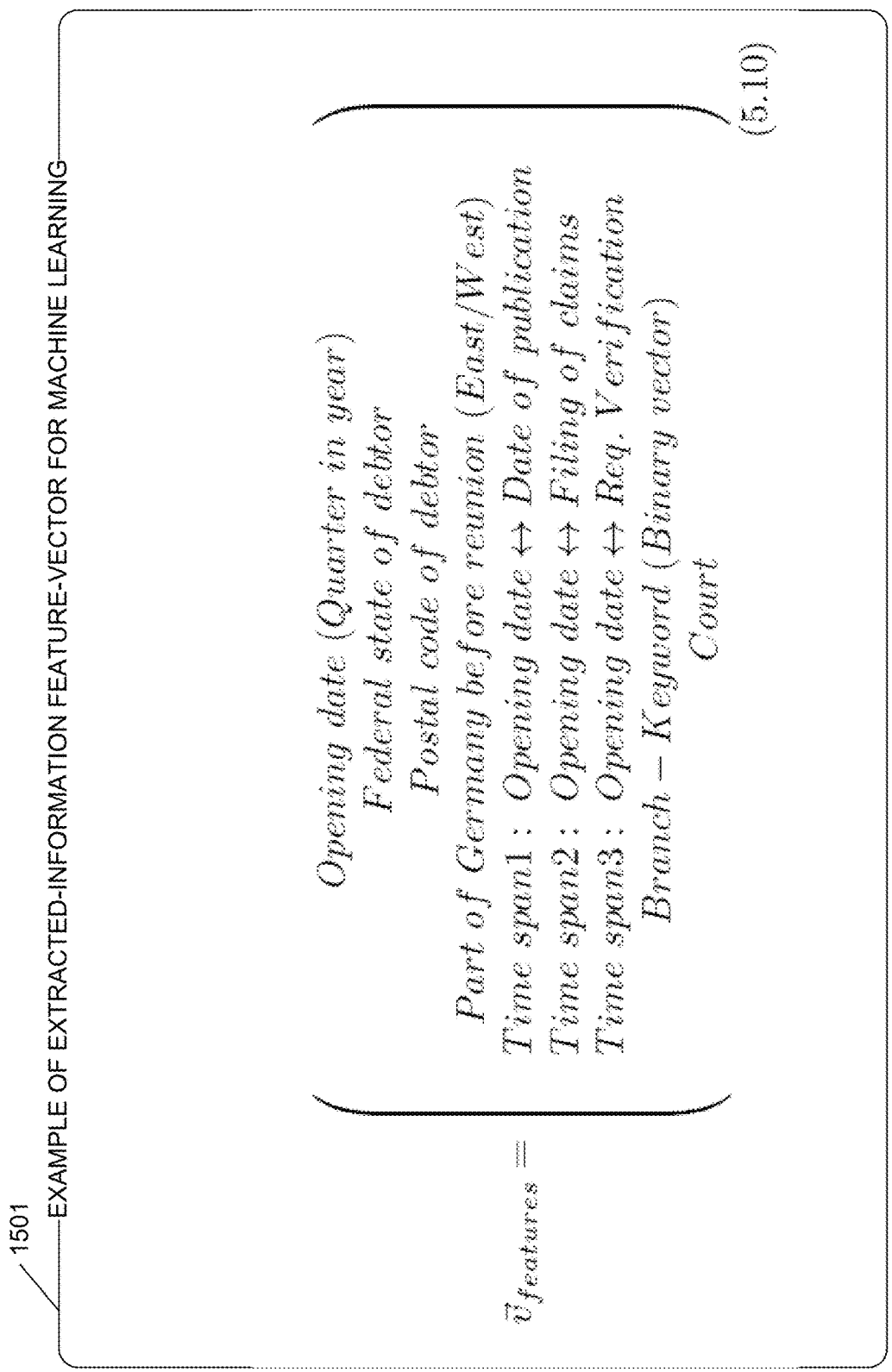
FIG. 15 illustrates an overview of creation of a feature vector fro extracted information.

FIG. 15 is an illustrative overview of the creation of a feature vector 1500 from the extracted information. When categorical data is represented in a mathematical model, each categorical value can be represented by a numerical value, and the like. This numerical value can be unique for each value a category can hold in the entire data set. When this representation is created, the quality of the machine learning and clustering is best when all of the suitable available addressing space is used. This process can be implemented automatically, by taking into account all suitable values for all different categories of the extracted structural, syntactic and semantic information, and the like.

In this process, users can also select the most relevant categories of extracted information, and the most relevant values per category, as input for the feature vectors, thereby highly reducing the number of dimensions of the feature vectors, and which focuses the model on the most relevant (e.g., most distinguishing) features per document class, and thus reducing the complexity of the machine learning model, and the training, testing and classification time, and the like.

FIG. 16 is an illustrative overview 1600 of the bag-of-words approach and creation of feature vectors for machine learning. From this example, it can be seen that very different sentences obtain similar vector representation, and visa versa different sentences obtain similar vectors. This disadvantageous effect highly disturbs and confuses the quality of the machine learning and clustering algorithms, as compared to the systems and methods of the present invention.

The above-described devices and subsystems of the illustrative embodiments can include, for example, any suitable servers, workstations, PCs, laptop computers, PDAs, Internet appliances, handheld devices, cellular telephones, smart phones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A computer implemented system for automatic document classification, the system comprising:
a processor;
a display device;
a memory in electronic communication with the processor; and
instructions stored in the memory, the instructions being executable by the processor to:
implement an extraction device to extract structural, syntactical, and semantic information from a document and normalize the extracted information,
wherein the extracted information includes named entities, properties of entities, noun-phrases, facts, events, sentiments, emotions, symbolism and concepts;
implement a machine learning device to generate a model representation for automatic document classification based on feature vectors built only from the normalized and extracted semantic information for machine learning and clustering; and
implement a classification device to select a non-classified document from a document collection, and via the extraction device extract the normalized structural, syntactical, and semantic information from the selected document, and generate via the machine learning device, the model representation of the selected document based on the feature vectors, and match the model representation of the selected document against the machine learning model representation to generate a document category, and classification for display on the display device to a user.

2. The system of claim 1, wherein the extraction device employs text-mining, language identification, gazetteers, regular expressions, noun-phrase identification with part-of-speech taggers, and statistical models and rules, and is configured to identify patterns, and
the patterns include libraries, and algorithms shared among cases, and which can be tuned for a specific case, to generate case-specific semantic information.

3. The system of claim 1, wherein the extracted information is normalized by using normalization rules, groupers, thesauri, taxonomies, and string-matching algorithms.

4. The system of claim 1, wherein the model representation of the document is a term frequency-inverse document frequency (TF-IDF) document representation of the extracted information, and the clustering and machine learning includes a classifier based on support vector machines (SVM), rules-based classification, Non-Negative Matrix Factorization (NMF), Continuous Active Learning (CAL), Simple Passive Learning (SPL), and hierarchical clustering methods.

5. The system of claim 1, wherein the document comprises document sections, including pages of a document, paragraphs of a document, chapters of a document, and text sections of a document.

6. The system of claim 5, wherein the document sections are from a predetermined time-based period representing learned, and extracted temporal patterns.

7. The system of claim 1, wherein the system employs precision and recall in combination with cross validation to measure a quality of classifiers or cluster algorithms based on a training set and documents classified that are not in the training set, and representing an increase or decrease of a quality of the system in time as well as indicative cost measurements for classification of additional documents manually or automatically.

8. The system of claim 1, wherein the document comprises multi-media files.

9. A computer implemented method for automatic document classification, the method comprising:
providing a processor, a display device, a memory in electronic communication with the processor, and instructions stored in the memory, the instructions being executable by the processor to perform the steps of:
extracting with an extraction device structural, syntactical, and semantic information from a document and normalizing the extracted information,
wherein the extracted information includes named entities, properties of entities, noun-phrases, facts, events, sentiments, emotions, symbolism and concepts;
generating with a machine learning device a model representation for automatic document classification based on feature vectors built only from the normalized and extracted semantic information for machine learning and clustering; and
selecting with a classification device a non-classified document from a document collection, and via the extraction device extract the normalized structural, syntactical, and semantic information from the selected document, and generate via the machine learning device, the model representation of the selected document based on the feature vectors, and match the model representation of the selected document against the machine learning device representation to generate a document category, and classification for display on the display device to a user.

10. The method of claim 9, wherein the extraction device employs text-mining, language identification, gazetteers, regular expressions, noun-phrase identification with part-of-speech taggers, and statistical models and rules, and is configured to identify patterns, and
the patterns include libraries, and algorithms shared among cases, and which can be tuned for a specific case, to generate case-specific semantic information.

11. The method of claim 9, further comprising:
normalizing the extracted information using normalization rules, groupers, thesauri, taxonomies, and string-matching algorithms.

12. The method of claim 9, wherein the model representation of the document is a term frequency-inverse document frequency (TF-IDF) document representation of the extracted information, and the clustering and machine learning includes a classifier based on support vector machines (SVM), rules-based classification, Non-Negative Matrix Factorization (NMF), Continuous Active Learning (CAL), Simple Passive Learning (SPL), and hierarchical clustering methods.

13. The method of claim 9, wherein the document comprises document sections, including pages of a document, paragraphs of a document, chapters of a document, and text sections of a document.

14. The method of claim 13, wherein the document sections are from a predetermined time-based period representing learned, and extracted temporal patterns.

15. The method of claim 9, further comprising:
employing precision and recall in combination with cross validation to measure a quality of classifiers or cluster algorithms based on a training set and documents classified that are not in the training set, and representing an increase or decrease of a quality of the system in time as well as indicative cost measurements for classification of additional documents manually or automatically.

16. The method of claim 9, wherein the document comprises multi-media files.

17. A computer program product for automatic document classification and including a processor, a display device, a memory in electronic communication with the processor, and instructions stored in the memory, the instructions being executable by the processor to perform the steps of:
extracting with an extraction device structural, syntactical, and semantic information from a document and normalizing the extracted information,
wherein the extracted information includes named entities, properties of entities, noun-phrases, facts, events, sentiments, emotions, symbolism and concepts;
generating with a machine learning device a model representation for automatic document classification based on feature vectors built only from the normalized and extracted semantic information for machine learning and clustering; and
selecting with a classification device a non-classified document from a document collection, and via the extraction device extract the normalized structural, syntactical, and semantic information from the selected document, and generate via the machine learning device, the model representation of the selected document based on the feature vectors, and match the model representation of the selected document against the machine learning device representation to generate a document category, and classification for display on the display device to a user.

18. The computer program product of claim 17, wherein the extraction Currently amended employs text-mining, language identification, gazetteers, regular expressions, noun-phrase identification with part-of-speech taggers, and statistical models and rules, and is configured to identify patterns, and
the patterns include libraries, and algorithms shared among cases, and which can be tuned for a specific case, to generate case-specific semantic information.

19. The computer program product of claim 17, further comprising:
normalizing the extracted information using normalization rules, groupers, thesauri, taxonomies, and string-matching algorithms.

20. The computer program product of claim 17, wherein the model representation of the document is a term frequency-inverse document frequency (TF-IDF) document representation of the extracted information, and the clustering and machine learning includes a classifier based on support vector machines (SVM), rules-based classification, Non-Negative Matrix Factorization (NMF), Continuous Active Learning (CAL), Simple Passive Learning (SPL), and hierarchical clustering methods.

21. The computer program product of claim 17, wherein the document comprises document sections, including pages of a document, paragraphs of a document, chapters of a document, and text sections of a document.

22. The computer program product of claim 21, wherein the document sections are from a predetermined time-based period representing learned, and extracted temporal patterns.

23. The computer program product of claim 17, further comprising:
employing precision and recall in combination with cross validation to measure a quality of classifiers or cluster algorithms based on a training set and documents classified that are not in the training set, and representing an increase or decrease of a quality of the system in time as well as indicative cost measurements for classification of additional documents manually or automatically.

24. The computer program product of claim 17, wherein the document comprises multi-media files.

\* \* \* \* \*